H. M. Ritter.
Knob Latch.

No. 3,578. Reissued Aug. 3, 1869.

Witnesses:

J. H. Layman
H. G. Weber

Inventor:
Henry M. Ritter
By Wright Bros
Patent Attorneys.

N. PETERS, PHOTO-LITHOGRAPHER, WASHINGTON, D. C.

United States Patent Office.

M. GREENWOOD AND COMPANY, OF CINCINNATI, OHIO, ASSIGNEES OF HENRY M. RITTER.

*Letters Patent No.* 64,571, *dated May* 7, 1867; *reissue No.* 3,578, *dated August* 3, 1869.

IMPROVEMENT IN REVERSIBLE KNOB-LATCHES.

The Schedule referred to in these Letters Patent and making part of the same.

*To whom it may concern:*

Be it known that HENRY M. RITTER, of Cincinnati, Hamilton county, Ohio, invented a new and useful Reversible Latch-Lock; and we hereby declare the following to be a full, clear, and exact description thereof, reference being had to the accompanying drawings, making part of this specification.

The invention of said RITTER relates to the class of door-locks whose latch is made capable of reversal, to suit a right or left-hand door, and consists of a form of latch and its accessories which (on removal of one of the wood-screws that fastens the lock to the door) enables the easy semi-rotation of the latch by the hand of the operator, without withdrawal from or change of its location in the case, and which latch, on return of said screw to its place, becomes irreversible.

Figure 1 includes a front and side elevation of a lock embodying the said invention, a portion of the cap being broken away.

Figure 1:
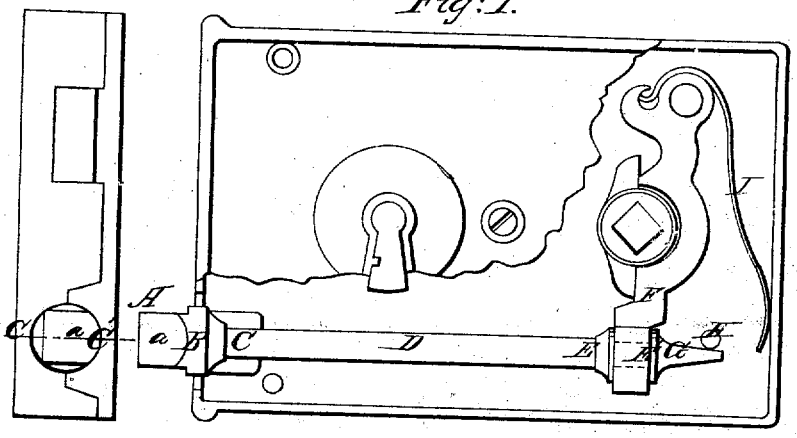
Figure 2:
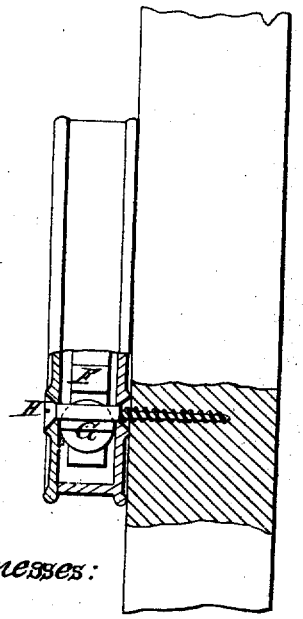
Figure 2 is a vertical section of a part of the lock in position on the door.
Figure 3:
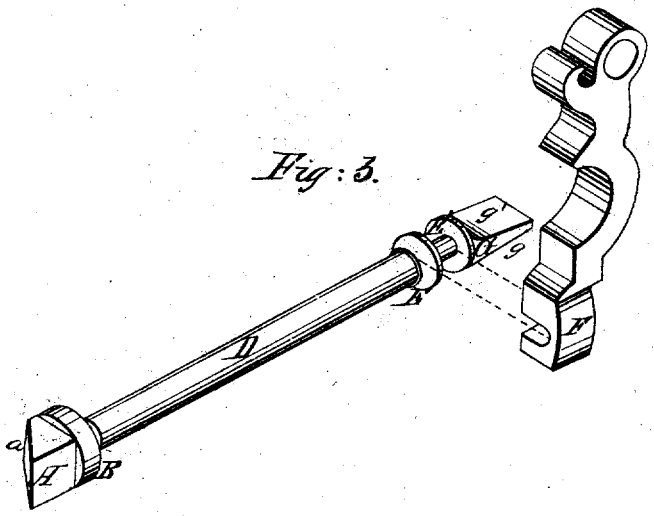
Figure 3 is a perspective view of the latch and lever detached.

The latch-head A has the customary bevel, *a*, for impinging against the striker.

Cast solidly upon and forming part of the latch is a cylindrical or other collar, B, which fits and occupies a corresponding socket, C C′, in those portions of the case which constitute the front of the lock and cap, respectively.

The latch-shank D has collars, E E′, for the action of a lever, F, of any approved form.

The extreme rear end of the latch, behind the collars, consists of a tail, G, having two opposite and similar flat sides, *g g′*, one of which, when the latch is properly inserted in the lock, is tangential to the hole H, provided for one of the wood-screws, by which the lock is fastened to the door.

A plate-spring, I, engaging in a notch in the top of the lever F, holds the said lever and latch to the forward position.

The form selected for illustration is one which actual use has proved to be effectual, but various modifications are possible; for example, the flattened portion of the latch, and the screw-hole to which it is tangential, may be situated between the collars E E′ and the head of the latch, so as to dispense with that portion of the shank or tail in rear of the collars.

A recess or cavity, K, in the case, and a similar one in the cap, enable the retractory motion, or inward stroke of the latch, in the act of closing the door. This cavity would obviously permit the reversal of the latch, when thus retracted, even were the collar other than circular.

It is not desired, therefore, to restrict this invention to a circular collar, or corresponding socket, as the same may be octagonal, or of other convenient form.

What is claimed herein as new, and as the invention of the said HENRY M. RITTER, is—

The reversible latch A D, whose collar B occupies a suitable socket, C, and whose flat two-sided tail or shank G is tangential to one of the screw-holes in both positions of the latch, so as to render the latter irreversible, by the direct contact of the holding-screw, substantially as described.

In testimony of which invention, we hereunto set our hands.

MILES GREENWOOD.
PHILIP Y. BROWN.
WILLIAM M. GREENWOOD.

Witnesses:
GEO. H. KNIGHT,
JAMES H. LAYMAN.